(12) United States Patent
Ford et al.

(10) Patent No.: US 9,868,618 B2
(45) Date of Patent: Jan. 16, 2018

(54) CRANE AND RELATED METHOD OF OPERATION

(71) Applicant: Jaguar Land Rover Limited, Whitley, Coventry, Warwickshire (GB)

(72) Inventors: Niall Ford, Warrington (GB); Andy Conlon, Widnes (GB); Daniel Thatcher, Woolton (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 271 days.

(21) Appl. No.: 14/406,177

(22) PCT Filed: Jun. 7, 2013

(86) PCT No.: PCT/EP2013/061788
§ 371 (c)(1),
(2) Date: Dec. 5, 2014

(87) PCT Pub. No.: WO2013/182676
PCT Pub. Date: Dec. 12, 2013

(65) Prior Publication Data
US 2015/0144582 A1    May 28, 2015

(30) Foreign Application Priority Data

Jun. 7, 2012    (GB) .................................. 1210057.4
Jun. 7, 2012    (GB) .................................. 1210058.2

(51) Int. Cl.
*B66C 15/04*    (2006.01)
*B66C 13/46*    (2006.01)
(Continued)

(52) U.S. Cl.
CPC ............ *B66C 15/045* (2013.01); *B66C 13/46* (2013.01); *B66C 15/065* (2013.01); *F16P 3/142* (2013.01)

(58) Field of Classification Search
CPC ...... B66C 15/045; B66C 13/46; B66C 15/065; F16P 3/142
(Continued)

(56) References Cited

U.S. PATENT DOCUMENTS 3,772,579 A * 11/1973 Stone .................... B66B 1/06
                                                   318/742
5,662,311 A * 9/1997 Waedekin ............. B66C 13/105
                                                   254/270
(Continued)

FOREIGN PATENT DOCUMENTS

CN    201785143 U    4/2011
EP    1695936 A1    8/2006
(Continued)

OTHER PUBLICATIONS

Office Action and English summary for JP application No. 2015-515535, dated Dec. 9, 2015, 9 pages.
(Continued)

*Primary Examiner* — Marthe Marc-Coleman
(74) *Attorney, Agent, or Firm* — Reising Ethington P.C.

(57) ABSTRACT

The present invention relates to a crane (101). The crane (101) has a hoist (113) for performing a lifting operation and a controller (125) for controlling operation of the crane. At least one sensor (127) is provided for detecting the presence of a person in a safety region (129). The controller (125) is configured to inhibit operation of the crane (127) when the sensor (127) detects a person in the safety region (129). The present invention also relates to a crane control system and a method of operating a crane (101).

20 Claims, 10 Drawing Sheets

(51) Int. Cl.
   *B66C 15/06* (2006.01)
   *F16P 3/14* (2006.01)

(58) Field of Classification Search
   USPC .................. 701/50; 340/679, 685; 348/139
   See application file for complete search history.

(56) References Cited

U.S. PATENT DOCUMENTS

| | | | |
|---|---|---|---|
| 6,065,619 A | | 5/2000 | Miyata et al. |
| 6,186,280 B1 * | | 2/2001 | Healy .................. B66F 7/04 187/207 |
| 6,985,085 B1 * | | 1/2006 | Brown .................. B66C 15/065 212/276 |
| 2003/0001118 A1 * | | 1/2003 | Murata .............. H01L 21/67259 250/559.33 |
| 2008/0290842 A1 * | | 11/2008 | Davis .................. B60L 7/24 320/166 |
| 2010/0275472 A1 * | | 11/2010 | Cunningham ........ B60P 1/5438 37/403 |
| 2011/0187548 A1 * | | 8/2011 | Maynard .............. B66C 15/045 340/685 |
| 2012/0081537 A1 * | | 4/2012 | Arcand .................. F16P 3/14 348/86 |
| 2012/0323369 A1 * | | 12/2012 | Lee .................. E04H 6/12 700/275 |

FOREIGN PATENT DOCUMENTS

| | | | |
|---|---|---|---|
| FR | 2954560 A1 | | 6/2011 |
| JP | S60153392 A | | 8/1985 |
| JP | H03205296 A | | 9/1991 |
| JP | H0538655 A | | 2/1993 |
| JP | H10167666 A | | 6/1998 |
| JP | 2000129919 A | * | 5/2000 |
| JP | 2000129919 A | | 5/2000 |
| JP | 2000191278 A | | 7/2000 |
| JP | 2001213588 A | | 8/2001 |
| JP | 2005145599 A | * | 6/2005 |
| JP | 2005145599 A | | 6/2005 |
| JP | 2008265984 A | | 11/2008 |
| JP | 2008265984 A | * | 11/2008 |
| JP | 2010241548 A | | 10/2010 |
| KR | 20100120459 A | | 11/2010 |
| WO | WO2013011199 A1 | | 1/2013 |

OTHER PUBLICATIONS

International Search Report for application No. PCT/EP2013/061788, dated Aug. 23, 2013, 6 pages.
UK Combined Search and Examination Report for corresponding application No. GB1210058.2, dated Oct. 8, 2012, 6 pages.
Chinese Office Action in Chinese corresponding to CN application No. 201380040232.3, dated Apr. 15, 2016, 11 pages.

* cited by examiner

Figure 5

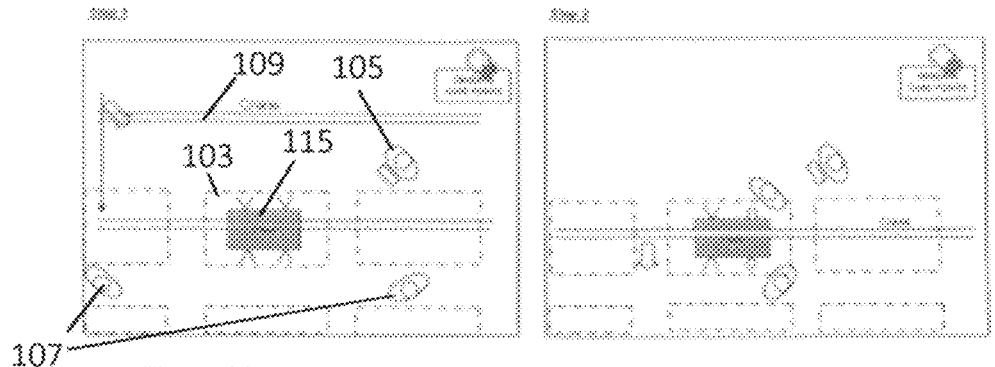
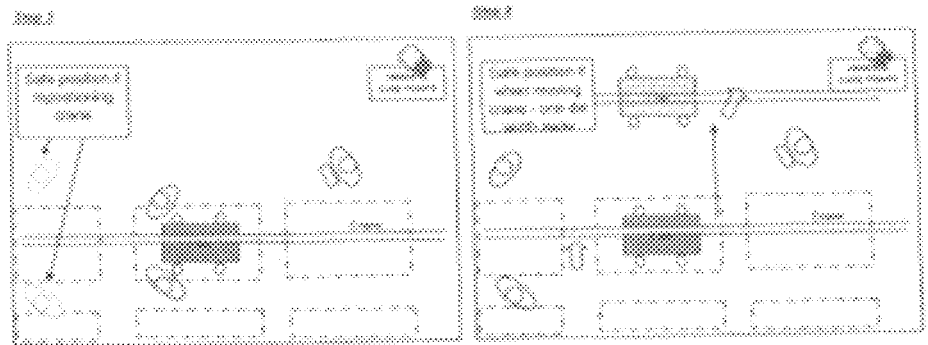
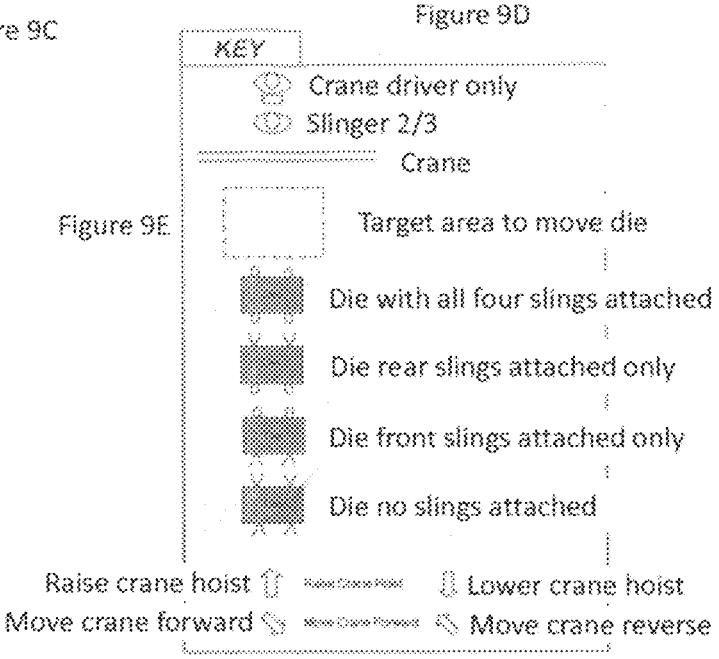
Figure 9A
Figure 9B
Figure 9C
Figure 9D
Figure 9E

CRANE AND RELATED METHOD OF OPERATION

TECHNICAL FIELD

The present invention relates to a crane, a crane control system and a method of operating a crane.

BACKGROUND OF THE INVENTION

It is well known to use a gantry crane 1 of the type illustrated in FIG. 1 to transport a load in a manufacturing plant. For example, gantry cranes 1 are used to transport machine dies 3 for pressing motor vehicle body panels in a sheet metal pressing facility. The crane 1 is operated by a dedicated crane operator and one or more sling operators.

The crane 1 comprises a bridge 9 movable in a longitudinal direction X. A crab unit 11 housing a hoist 13 is movably mounted on the bridge 9 and can travel in a transverse direction Y. A rectangular lifting frame 15 is supported by the hoist 13 and tour slings 17*a-d* are permanently connected to the lifting frame 15. The four slings 17*a-d* each have a coupling provided at their free ends (i.e. at the end distal from the lifting frame 15) to be attached to respective fixing points 19*a-d* on a load such as a press tool or die 3 and secured by a locking pin. Operating the hoist 13 raises and lowers the lifting frame 15, thereby raising and lowering the die 3. The die 3 is transported by moving the bridge 6 and/or the crab unit 11 once the die 3 has been raised.

In view of the loads involved, the transport of the die 3 to and from the die bed is potentially dangerous. When the lifting frame 15 is travelling within the die bed, one of the slings 17*a-d* could snag a stationary object (such as a die 3) causing it to be displaced. When a lifting operation is initially performed by the hoist 13, one of the slings 17*a-d* could snag on the die 3 to be lifted and result in an uncontrolled movement. Furthermore, when the die 3 is initially lifted it may be out of balance resulting in an initial displacement or swinging action before the die 3 centres. When the die 3 is travelling, it could collide with a stationary object or another die 3. These are potentially hazardous scenarios and considerable care is required by the crane and sling operators.

The present invention sets out to help ameliorate or overcome at least some of the problems associated with prior art systems.

SUMMARY OF THE INVENTION

Aspects of the present invention resale to a crane, a crane control system and a method of operating a crane.

An aspect of the present invention relates to a crane comprising:
 a hoist for performing a lifting operation;
 a controller for controlling operation of the crane; and
 at feast one sensor for detecting the presence of a person in a safety region;
 wherein the controller is configured to inhibit operation of the crane when the sensor detects a person in the safety region.

Inhibiting operation of the crane when a person is detected in the safety region can help to ensure safe operation of the crane. The crane according to embodiments of the present invention can promote safe operating procedures by ensuring that a person does not enter the defined safety region when the crane is operating. The safety region can, for example, be defined around a load carried by the crane.

The at least one sensor can comprise a camera. The camera could be an optical camera. A shape recognition processor could be used to defect the presence or absence of a person in a video image. Alternatively, the camera can be a thermal imaging camera suitable for detecting the body heat of a person entering the safety region. Alternatively, the at least one sensor can be a motion detection sensor. More than one camera can be provided, for example to avoid blind spots being created around a load.

The controller can be configured to inhibit performance of a lifting operation by the hoist when said at least one sensor detects a person in said safety region. The controller can be configured to inhibit the lifting operation by reducing the operating speed of the hoist; or stopping operation of the hoist.

Ensuring that there isn't a person within the safety region is particularly important when a load is initially raised info the air by the hoist (referred to herein as an initial lifting operation). Significantly, a load swing is induced during the initial lifting operation if the hoist is offset from the centre of gravity of the load. The controller can be configured to halt a lifting operation if a person is detected in the safety region during an initial lifting operation.

The hoist can be movable in at least one lateral direction. For example, the hoist can be mounted on a crab unit which can travel in first and second lateral directions (East/West). The crab unit can be mounted on a bridge which can travel in third and fourth lateral directions (North/South). The controller can be configured to inhibit lateral movement of the hoist when the sensor detects a person in said safety region. The controller can be configured to inhibit lateral movement of the hoist by reducing a travel speed of the hoist in one or more directions. Alternatively, the controller can be configured to inhibit lateral movement of the hoist by permitting only incremental lateral movements of the hoist.

A load sensor can be provided for measuring an applied load. The load sensor can monitor the applied load and thereby determine when an initial lifting operation is performed.

An initial lifting operation is typically performed at a pre-defined height relative to the ground. For example, a coupling attached to the hoist will be within a defined height range when an initial lifting operation occurs. An encoder can be provided for measuring the hoist position to allow the height of the coupling to be determined. The controller can thereby determine when an initial lifting operation is being performed with reference to the measured height.

The controller can be configured to inhibit an active lifting operation for a defined period of time following detection of an initial lifting operation. The controller can be configured to inhibit the hoist lifting operation by stopping operation of the hoist. The hoist lifting operation can be inhibited by reducing the operating speed of the hoist or halting operation of the hoist.

The crane can further comprise a display for indicating the operational status of the crane. The display can comprises at least a first indicator for indicating when said at least one sensor detects a person in said safety region. At least said first indicator can be a lamp or other visual display means.

A tracking system could be implemented for tracking the location of one or more safety control units associated with the crane. In use, a safety control unit would be carried on the person of a sling operator. The tracking system could use range-finding or triangulation techniques to identify the safety control unit (and indirectly the person) within the safety region. The display could be configured to identify the person detected in said safety region.

The display can be mounted on the crane, for example on the bridge of the crane. At least in preferred arrangements, the display can be viewed by each person working in proximity to the crane.

According to a further aspect of the present invention there Is provided a crane comprising:
- a hoist for performing a lifting operation, the hoist being movable in at least one lateral direction;
- a controller for controlling lateral movement of the hoist; and
- a sensor for detecting a person in a defined safety region;
- wherein the controller is configured to inhibit operation of the hoist when the sensor detects a person in said safety region.

The sensor can be an imaging sensor or a motion detection sensor. The controller can be configured to inhibit operation of the hoist by inhibiting lateral movement of the hoist. The controller can be configured to inhibit lateral movement of the hoist by reducing a travel speed of the hoist; or permitting only incremental lateral movements of the hoist.

The crane can further comprise a height sensor for monitoring a height of a coupling attached to the hoist for connection to a load. The controller can be configured to inhibit operation of the crane when the height sensor detects that the coupling is below a pre-defined operating height.

In a further aspect, the present invention relates to a method of operating a crane comprising a hoist for performing a lifting operation and at least one sensor for detecting the presence of a person in a safety region; wherein the method comprises inhibiting operation of the crane when the sensor defects a person in the safety region.

The method can comprise identifying an initial lifting operation. The method can comprise stopping a hoist lifting operation for a defined period of time following detection of an initial lifting operation. The method can include the step of measuring an applied load and/or measuring an operating height of a coupling attached to the hoist.

The method can include the further step of identifying a person detected in the safety region. The person can be identified by determining the location of a portable safety unit associated with that person.

According to a further aspect of the present invention there is provided a method of operating a crane comprising e hoist movable in at least one lateral direction and a sensor for detecting a person in a defined safety region, wherein the method comprises monitoring a defined safety region to detect the presence of a person in the defined safety region; and inhibiting operation of the crane by inhibiting lateral movement of the hoist when the presence of a person is detected in the defined safety region.

According to a further aspect of the present invention there is provided a method of operating a crane comprising a hoist;
- wherein the method comprises inhibiting a hoist lifting operation for a defined period of time following application of an initial lead.

The invention further relates to a crane control system for implementing the method described herein.

The present invention also relates to a crane control system configured to implement one or more of the methods described herein. The crane control system can be machine-implemented.

In a further aspect the present invention relates to a computer system comprising: programmable circuitry; and software encoded on at least one computer-readable medium to program the programmable circuitry to implement one or more of the methods described herein.

According to a still further aspect the present invention relates to one or more computer-readable media having computer-readable instructions thereon which, when executed by a computer, cause the computer to perform all the steps of the method(s) described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

An embodiment of the present invention will now be described, by way of example only, with reference to the accompanying figures, in which:

FIG. 5 shows a truth table representing the crane operating modes for performing certain manoeuvres;

FIGS. 9A-E illustrate the steps for operating the crane to attach and transport a machine die according to an embodiment of the present invention.

DETAILED DESCRIPTION OF AN EMBODIMENT

The present invention relates to a control system for operating a crane in a manufacturing plant. The invention will be described with reference to an electrical overhead travelling (EOT) crane 101 for transporting loads such as machine dies 103 in a sheet metal pressing facility, for example in a ear manufacturing plant. By way of example, the dies 103 can each weigh 3-4 metric tons. The crane 101 is controlled by a crane operator and one or more sling operators.

Figure 1:
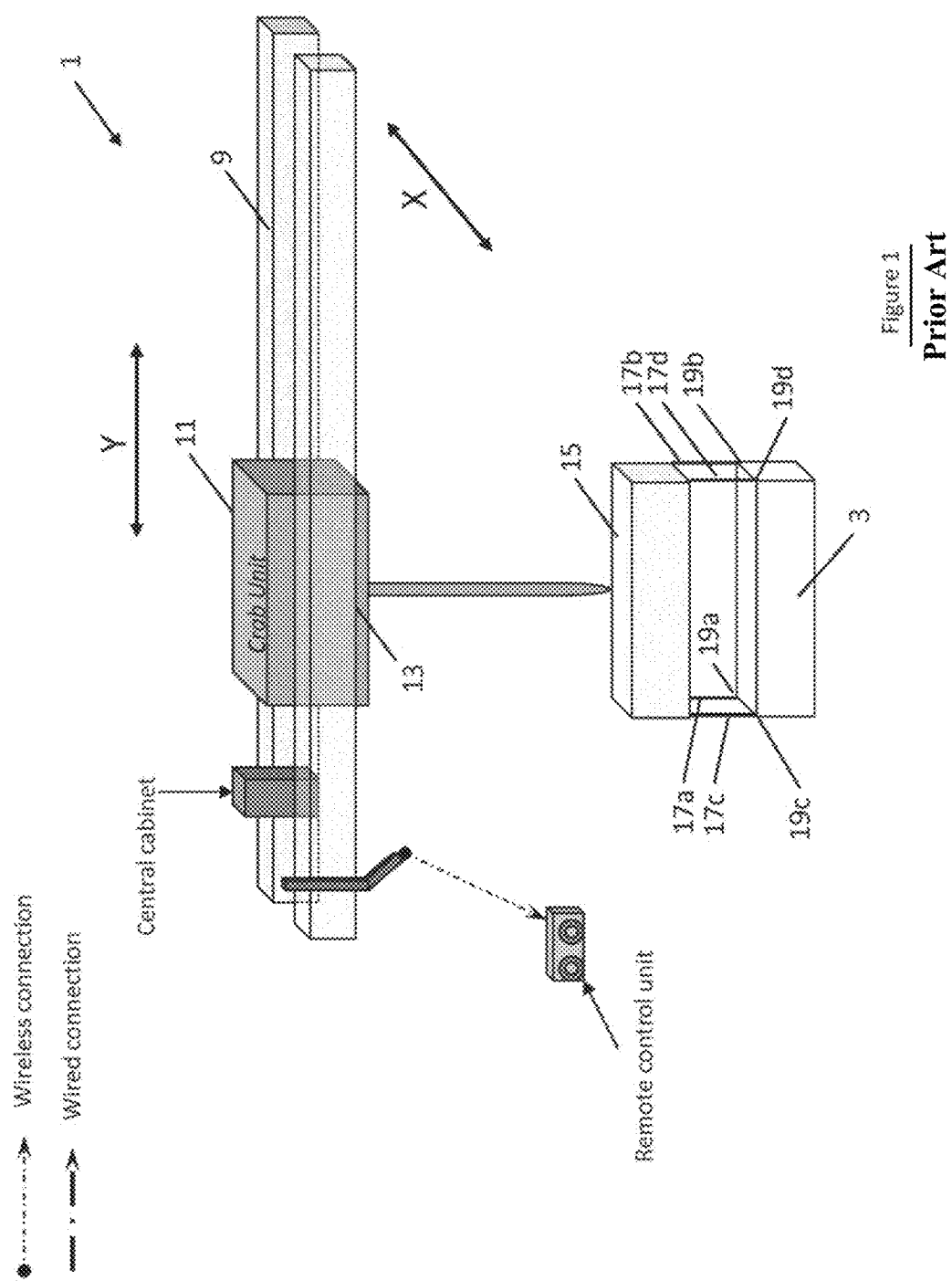
FIG. 1 shows schematically a conventional gantry crane representative of the prior art.
Figure 2:
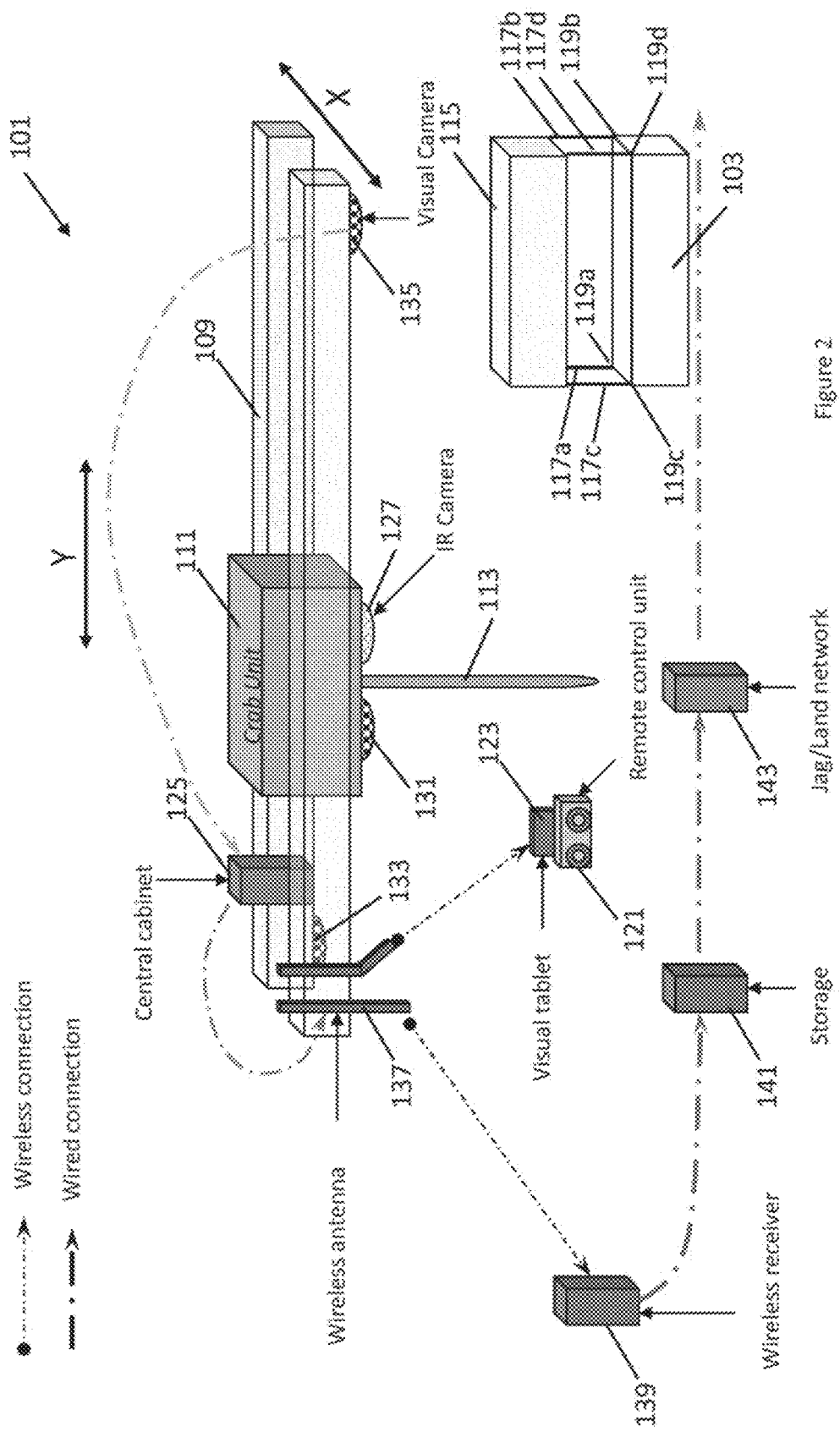
FIG. 2 shows schematically a gantry crane incorporating a control system in accordance with an embodiment of the present invention.

As shown in FIG. 2, the crane 101 comprises a bridge 109 movable in a longitudinal direction X (North/South). A crab unit 111 housing a hoist 113 is movably mounted on the bridge 108 and can travel in a transverse direction Y (East/West). The bridge 109 has three operating speeds and the crab unit 111 has two operating speeds. The hoist 113 has three operating speeds for performing lifting and lowering.

A rectangular lifting frame 115 is supported by the hoist 113 and four slings 117a-d are permanently connected to corners of the lifting frame 115. The slings 117a-d each have a hook (not shown) fixedly attached at their distal end for attachment to respective fixing points 119a-d on the die 103. Operating the hoist 113 raises and lowers the lifting frame 115, thereby raising and lowering the die 103. The die 103 is transported by moving the bridge 109 and/or the crab unit 111 once the die 103 has been raised.

The crane operator controls the crane 101 using a wireless remote control unit 121 incorporating a visual display unit 123. The remote control unit 121 communicates wirelessly with a central control unit 125 mounted on the bridge 109.

Figure 3:
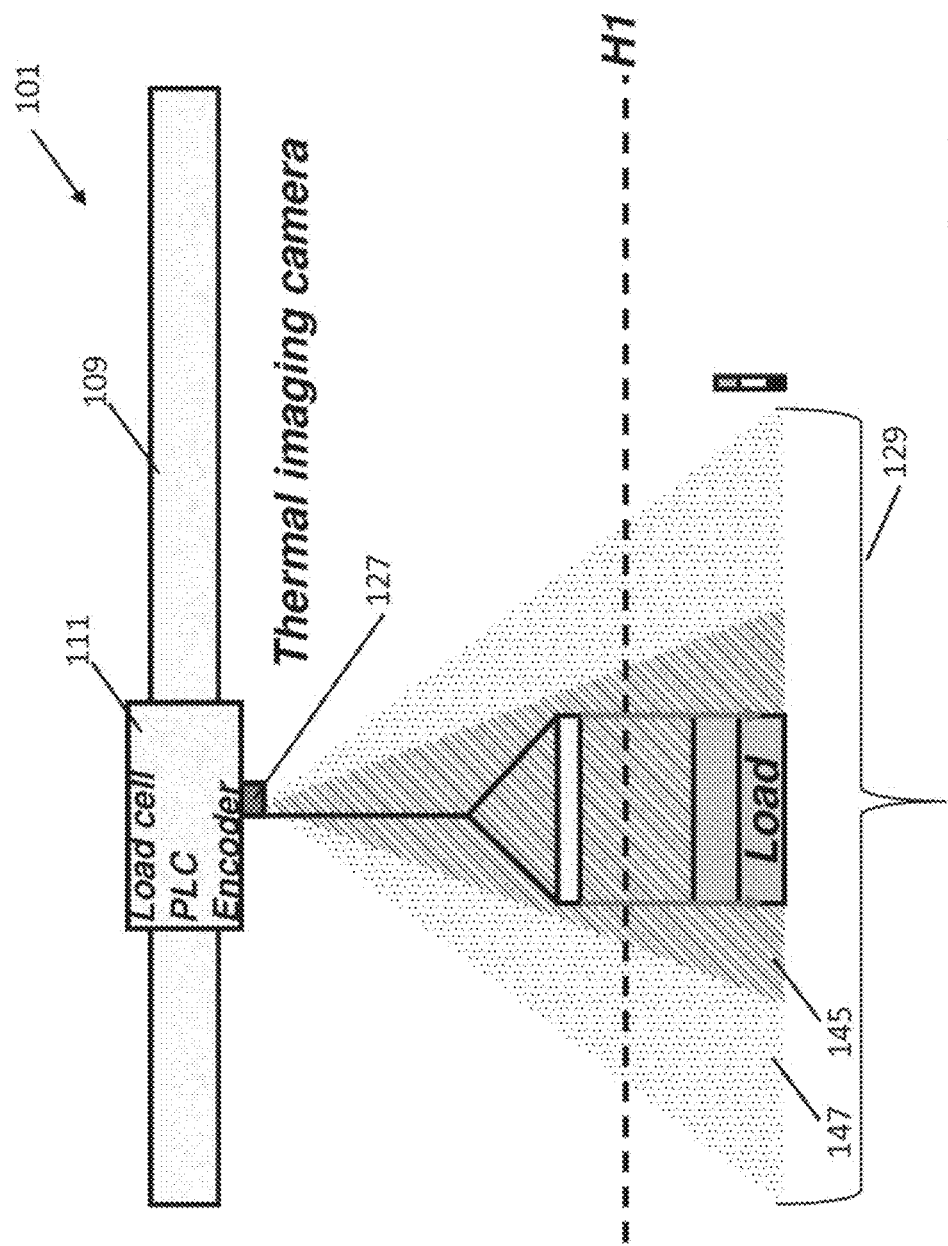
FIG. 3 shows schematically a side view of the operating range of a thermal imaging camera employed in an embodiment of the present invention.

An infra-red thermal imaging camera 127 is provided on the crab unit 111 to monitor an operating zone 129 shown in FIG. 3 encompassing the die 103. A first visual camera 131 is also provided on the crab unit 111 to generate a video stream showing the operating zone 129 in plan view. Second and third video cameras 133, 135 are mounted on opposite ends of the bridge 109 to provide alternate views of the operating zone 129. The video cameras 131, 133, 135 output video data to the central control unit 125.

The central control unit 125 is connected to a wireless transmitter and antenna 137 for wireless transmission of the video data. The transmitted video data is received by the remote control unit 121 to display the video data from the first video camera 131 on the visual display unit 123. The remote control unit 121 could optionally be configured to allow the crane operator to select the video data output from each of the visual cameras 131, 133, 135 for display on the visual display unit 123. A remote wireless receiver 139 also receives the transmitted video data and this data is stored on a storage device 141 coupled to a site network 143. The video data can be stored for a rolling period of, for example, 30 days to provide a reference library.

The operating zone 129 comprises an inner safety region 145 and an outer safety region 147 arranged concentrically. As described herein, the central control unit 125 modifies the control of the crane 101 depending on whether or not an operator (or other person) is present in the inner and outer safety regions 145, 147. The video data from one or more of the visual cameras 131, 133, 135 could be used to detect the presence or absence of an operator, but the movement of ancillary objects can result in high background noise levels. Accordingly, the present embodiment utilises the thermal imaging camera 127 to detect the presence or absence of an operator.

Figure 4:
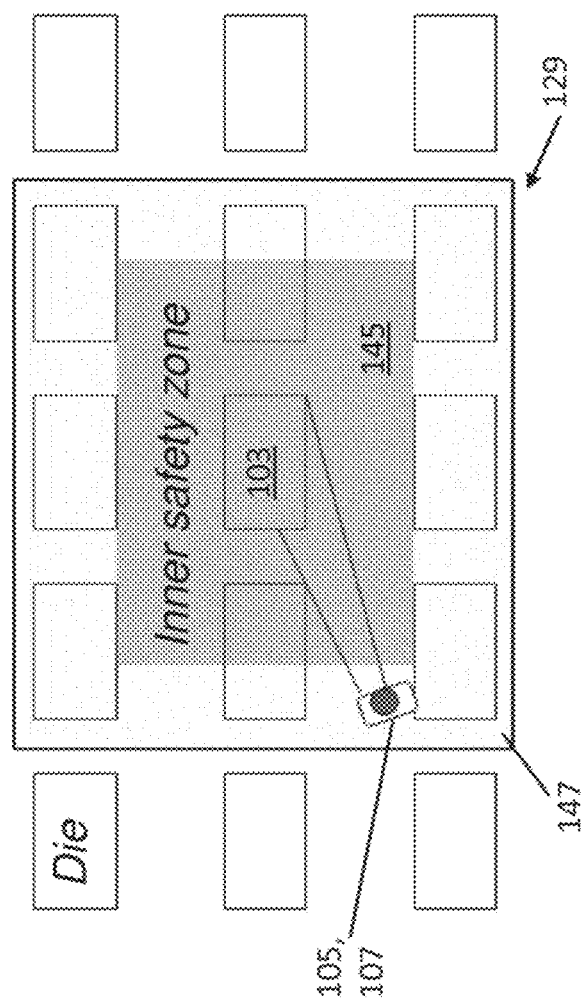
FIG. 4 shows schematically a plan view of the operating range of the thermal imaging camera illustrated in FIG. 3.

As shown in FIGS. 3 and 4, the thermal imaging camera 127 is directed vertically downwards and generates a thermal image of the area surrounding the die 3. The inner safety region 145 is defined as the region surrounding the die 103, typically one die width beyond an outer edge of the die 103. The outer safety region 147 corresponds to a further one die width beyond the inner safety region 145. It will be appreciated that the size of the inner and outer safety regions 145, 147 could be varied for different applications. The perimeter of the die 103 could be pre-defined or could be determined dynamically, for example using the video data from the first visual camera 131.

Figure 7:
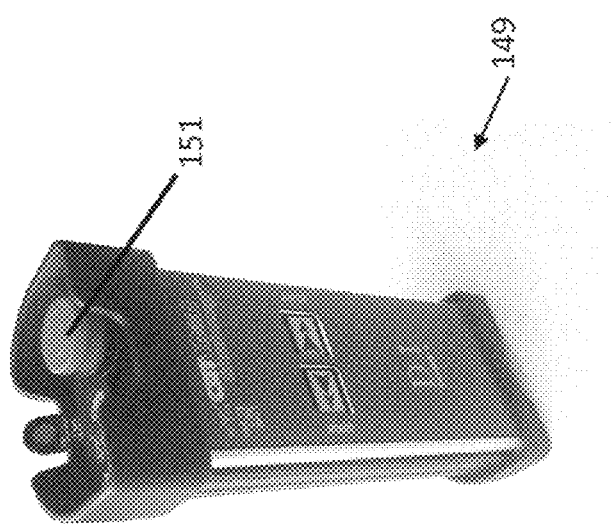
FIG. 7 shows a sling operator safety pendant according to a further aspect of the present invention.

In the event that an operator is defected in the outer safety region 147, the crane operator is notified, for example by illuminating a light. An example of such a light is shown in FIG. 7, if the operator enters the inner safety region 145, the central control unit 125 can disable or inhibit lateral movements of the bridge 109 and the crab unit 111. A lowering operation of the hoist 113 is enabled, but the lifting operation is disabled. Disabling the lifting operation ensures that the hoist 113 does not raise the load and thereby reduces load swing when an individual is proximal the die 103.

Figure 5:
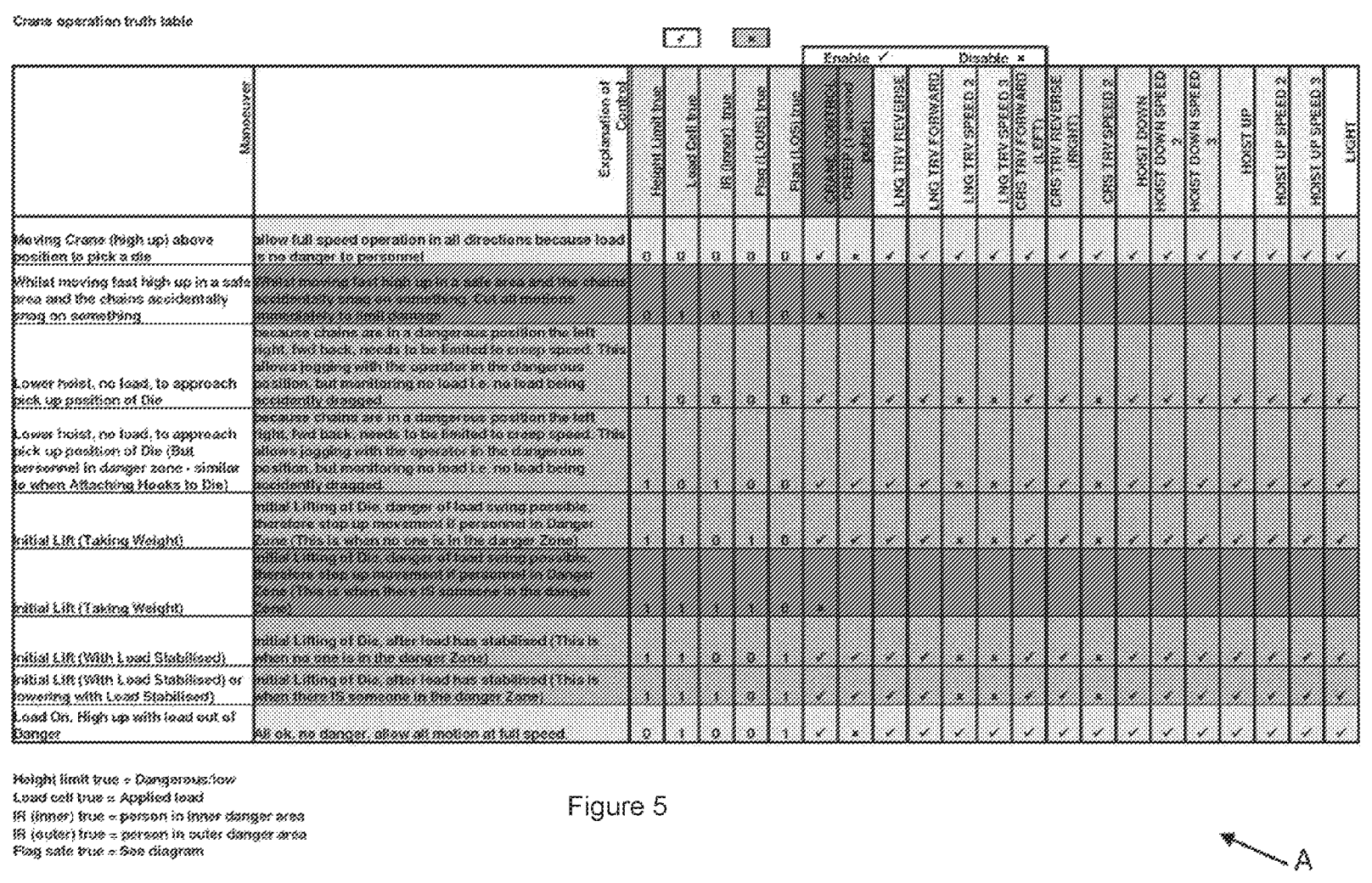

The central control unit 125 can operate in response to the output of the thermal imaging camera 127 in isolation, or in combination with a rotary encoder and/or a load cell, as described herein. For example, when the thermal imaging camera 127 detects an operator within the inner safety region 145, the central control unit 125 can be configured to disable or inhibit lateral movements of the crane 101 and/or operation of the hoist 113 only when a load is detected by the load cell. This arrangement enables operators to work within the inner safety region 146 to guide the lifting frame 115 info position for attaching the die 103. The operation of the crane 101 is disabled or inhibited only when a load is initially applied to the crane 101 and an operator is detected within the inner safety region 145. A truth table A representing the operating modes of the crane 101 in response to detected parameters is shown in FIG. 5. The safety control system implemented in the crane according to the present invention will now be described.

Reference Height (H1)

A rotary encoder (not shown) is provided in the hoist 113 to monitor the hoist travel position based on the height of the hooks provided on the slings 117a-d. A reference height H1 (shown in FIG. 3) is defined for controlling operation of the crane 101. In the present embodiment, the reference height H1 is set as the height of two stacked dies 103 plus one (1) meter to provide clearance above the stacked dies 103. It will be appreciated that the reference height H1 can be calibrated for a particular die bed or row of die beds in which the crane 101 is operating. The reference height H1 can be set for a particular crane 101, for example dependent on the die bed covered by the crane 101. The reference height H1 for a crane 101 covering a die bed containing multiple stacked dies 103 (for example double or triple stacked dies 103) is likely to be greater than the reference height H1 for a crane 101 covering a die bed with single stacked dies 101.

If the hooks are above the reference height H1, the crane 101 operates in a conventional manner with no restrictions on lateral travel of the bridge 109 or the crab unit 111. However, if the rotary encoder determines that the hooks are below the reference height H1, the translational movement of the bridge 109 and the crab unit 111 are both inhibited. Specifically, the central control unit 125 engages a restricted or inhibited travel mode (also referred to as a 'creep' mode) in which the bridge 100 and the crab unit 111 move a pre-set incremental distance in response to each discrete input made at the remote control unit 121 by the crane operator. Thus, the bridge 109 and the crab unit 111 advance a pre-set distance each time the controls on the remote control unit 121 are operated, for example the bridge 109 and/or the crab unit 111 travel for a one (1) second pulse. The raising and lowering operations of the hoist 113 remain unaffected when the inhibited travel mode is engaged. Rather than implement incremental travel, the central control unit 125 could reduce the travel speed of the bridge 109 and/or the crab unit 111 when the inhibited travel mode is engaged.

The engagement of the inhibited travel mode mitigates load swing and reduces lateral movements of the lifting frame 115 when the hooks are below the reference height H1. The crane operator is encouraged to position the lifting frame 115 directly above the die 103 at a height greater than the reference height H1. The lifting frame 115 can then be lowered by the hoist 113 below the reference height H1 and small lateral movements made accurately to position the lifting frame 115 and the hooks in relation to the die 103. The crane operator can then raise the lifting frame 115 and the die 103 vertically upwardly above the reference height H1 before undertaking any lateral movements. The likelihood of one of the hooks inadvertently snagging a die 103 is reduced as they are maintained above the reference height H1 during lateral travel.

Moreover, the likelihood of the die 103 colliding with a stationary object during travel is reduced as lateral travel is inhibited until the hooks are above the reference height H1. As the reference height H1 includes an additional clearance of 1 m above the height of two stacked dies 103, the supported die 103 will be above the other dies 103 in the die bed.

Load Cell

A load cell (not shown) is provided for measuring the load applied at the hoist 113 and outputting a load data signal to the central control unit 125. An increase in the defected load at the hoist 113 typically corresponds to an initial load application when a load is initially lifted and suspended from the crane 101. During an initial load application, the load cell can detect an increased load comprising an initial overshoot which then settles to a steady state. The central control unit 125 is configured to disregard any overshoot measurement and rely on sampling the load sensor signal at steady state. If the detected lead increases from a substantially steady state condition after the initial lead application, the central control unit 125 determines that a snag event has occurred and inhibits operation of the crane 101.

The central control unit 125 is configured to check the operational state of the crane 101 to determine whether a detected load is appropriate. The central control unit 125 can apply a filter or perform a comparison with a stored threshold to reduce the likelihood of incorrectly determining that a new load has been applied. In the present embodiment, a threshold load of 500 kg is used to determine whether a new load has been applied. If the central control unit 125 determines that an inappropriate load has been applied, safety protocols are initiated. Typical scenarios requiring the application of a safety protocol are outlined below by way of example.

An increase in the load applied when the lifting frame 115 is travelling in a lateral direction without a corresponding lifting operation, could be an indication that a hook has snagged a stationary die 3. This is dangerous as the force applied could displace the die 3. Accordingly, if the lifting frame 115 is undergoing lateral movement when an increase is defected in the load applied at the hoist 113, the central control unit 125 will stop movement of the crane 101. This is of particular importance if the hoist is travelling, for example above the reference height H1. The central control unit 125 could be configured to stop movement of the crane 101 only if the hooks are above the reference height H1 when the increased load is detected.

When the die 103 is first lifted there is a risk of load swing due to the lifting frame 115 being off-centre with the die 103. As a precaution, the sling operators should be clear of the die 103 when this initial lift occurs. The central control unit 125 classifies the initial lift scenario as load-on unsafe (LOUS) and a check is performed by the thermal imaging camera 127 to determine if any sling operators are within the inner safety region 145. If a sling operator is inside the inner safety region 145 when the load cell detects an increase in the applied load above the defined threshold, the central control unit 126 inhibits the lift operation of the hoist 113. An initial lift of the die 103 cannot be performed while a sling operator is detected, by the thermal imaging camera 127 within the inner safety region 145. Only when the inner safety region 145 is free of personnel can the hoist 113 perform an initial lift operation.

The lead swing will cease once the centre of gravity of the die 103 is directly beneath the lifting frame 115, at which point the die 103 can safely be lifted. The load swing is considered as having ceased five (5) seconds after an initial lift has occurred. The period of oscillation is dependent on the distance between the winch 113 and the centre of gravity of the load.

Therefore it will be appreciated that the time may vary dependent on the height of the bridge 109 above the die 103. Accordingly, the central control unit 125 classes the die 103 as load-on safe (LOS) after a predefined time period of five (5) seconds has elapsed following detection of an increase in the applied load by the load cell. Following the initial lift, if the thermal imaging camera 127 determines that a sling operator has entered the inner safety region 145, operation of the hoist 113 is permitted after this time period has elapsed.

Figure 6:
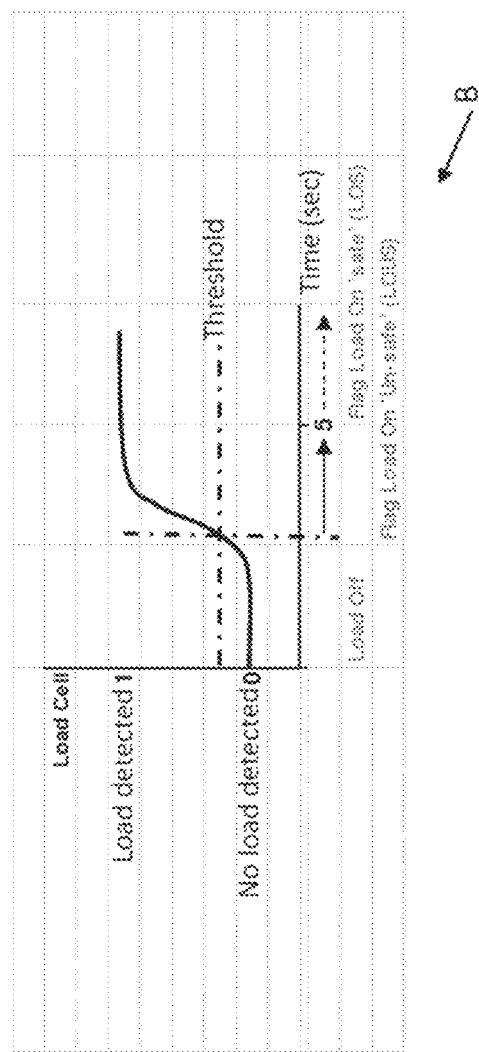
FIG. 6 shows a chart representing the safety classification of the load with reference to a measured load.

The classification of the load as LOUS or LOS with reference to the applied load detected by the load cell is illustrated with reference to a chart B in FIG. 6, The chart B is prepared on the basis that the hooks connected to the slings 17a-d are below the reference height H1.

The load cell can also be used to limit the maximum load applied to the crane 101. If the load cell detects a load greater than a defined threshold, for example 40 metric tons, the central control unit 125 can inhibit operation of the hoist 113 and optionally release some of the load. In the event that the crane 101 is operated to lift a die 103 which is bolted to a machine bolster, the central control unit 125 can stop the hoist 113 to prevent damage to the die 103 or the crane 101.

Pendant Control

As outlined above, the crane operator is provided with a remote control unit 121 for controlling operation of the crane 101. The remote control unit 121 is provided with a spring-biased activation switch (not shown) which must be actuated in order to operate the crane 101. The remote control unit 121 is also provided with a controller stop button (not shown) to stop operation of the crane 101.

A further aspect of the present invention relates to a machine control unit (MCU) pendant 148 for each sling operator, as illustrated in FIG. 7. A pendant stop button 151 is provided on the pendant 149 and this must be actuated each time the sling operator enters an area of potential danger, such as the inner safety region 146. The crane 101 is disabled when the pendant stop button 151 is actuated. The remote control unit 121 and said one or more pendants 140 are connected in series. The crane 101 can be operated only when an authorisation signal is received torn the remote control unit 121 and each pendant 149. Actuation of the controller stop button or a pendant stop button 151 (on any one of the active pendants 149) will stop operation of the crane 101. The central control unit 125 requires that each of the active pendants 149 be reset and that an affirmation signal is subsequently received from the remote control unit 121 in order to reset the crane 101.

The cameras 131, 133, 135 mounted on the bridge will continue to operate even after actuation of the controller stop button 151, so as to obtain a record of the entire process.

Gantry Display System

Figure 8:
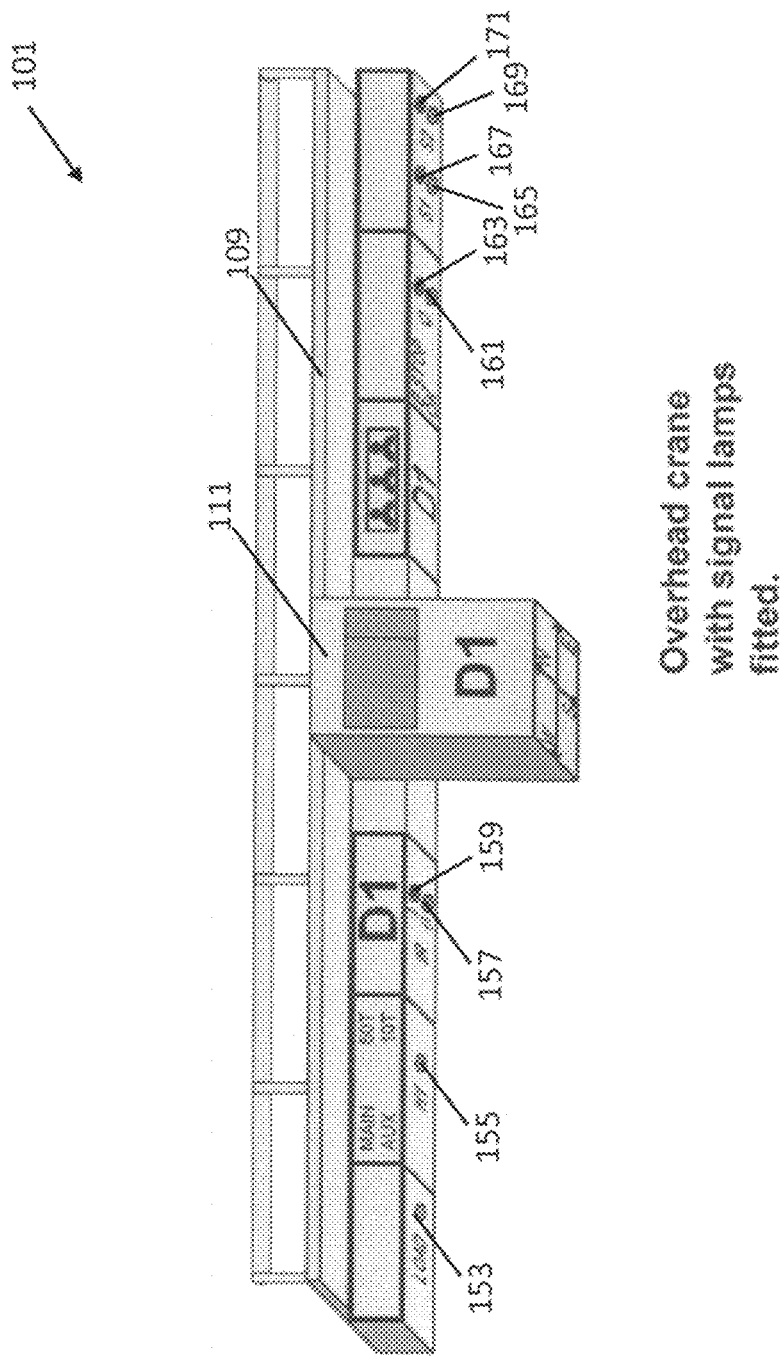
FIG. 8 shows a lighting system for displaying safety information en the crane according to an embodiment of the present invention.

As shown in FIG. 8, a lamp display panel is provided on the bridge 108 to indicate the operational status of the crane 101. By providing the lamps on the bridge 109, they are visible to the crane operator when the crane 101 is in use. Duplicate signals could optionally also be displayed on the remote control unit 121.

A first lamp 153 indicates whether a load is being carried by the crane 101. The first lamp 153 is illuminated when the load cell detects the application of a load at the hoist 113. A second lamp 155 indicates whether the hooks connected to the slings 117a-d are above the reference height H1. The second lamp 155 is illuminated when the rotary encoder determines that the hooks are below the reference height H1.

The presence or absence of a person, such as a sling operator, within the inner safety region 145 is indicated by third and fourth lamps 157, 159. The third lamp 157 is green and is illuminated when the thermal imaging camera 127 does not detect anyone within the inner safety region 145. The fourth lamp 159 is red and is illuminated when the thermal imaging camera 127 detects the presence of someone within the inner safety region 145.

The status of the controller stop button is displayed by fifth and sixth lamps 161, 163. The fifth lamp 161 is green and is illuminated when the remote control unit 121 is operational. The sixth lamp 163 is red and is illuminated when the controller stop button is actuated.

The status of first and second pendants 149 is displayed by corresponding pairs of lamps. Specifically, seventh and eighth lamps 165, 167 indicate the status of a first pendant 149. The seventh lamp 165 is green and is illuminated when the first pendant 149 is operational. The eighth lamp 167 is red and is illuminated when the pendant stop button 151 is actuated. The status of the second pendant 149 is indicated by corresponding ninth and tenth lamps 169, 171.

The lamp display panel can comprise additional lamps to indicate when the thermal imaging camera 127 has detected the presence of a person in the inner safety region 146 and/or the outer safety region 147.

The crane operator and the sling operators can readily determine the status of the crane 101 by referencing the lamp display panel on the bridge 109.

Operation

The procedural steps for attaching and transporting the die 103 will be described with reference to FIGS. 9A-D (with a reference key shown in FIG. 9E). The die 103 is supported on a rack in a die bed. To conserve space within the die bed, two or more dies 103 can be stacked on top of each other. The attachment of the die 103 to the crane 101 can be performed by a two (2) or three (3) person team. The procedure will be described for a three (3) person team made up of a dedicated crane operator 105 and two sling operators 107.

As illustrated in FIG. 9A, the crane 101 is initially displaced from the die 103. The hoist 113 is operated to raise the lifting frame 115 so as to clear any obstacles and prevent the slings 17a-d fouling. The lifting frame 115 is preferably raised sufficiently that the hooks provided on the slings 117a-d are above the reference height H1 to ensure that they do not snag any dies in the die bed as the lifting frame 115 travels to the die 103 to be transported. The crane operator 105 can determine when the hooks are above the reference height H1 by checking whether the second lamp 155 on the bridge 109 is illuminated. When the hooks are above the reference height H1, the central control unit 125 allows the crane 101 to travel in lateral directions at a normal operating speed.

The crane operator 105 positions the crane 101 over the die 103 such that a centre line of the fixing frame 115 is approximately in line with a centre of gravity of the die 103. The crane operator 105 is responsible for positioning the crane 101 while the sling operators 107 observe the crane movements and assist the crane operator 105.

As illustrated in FIG. 9B, the hoist 113 is then operated to lower the lifting frame 115 to enable the hooks to be attached to the fixing points 119a-d on the die 103. The lateral movements of the lifting frame 115 are at the normal operating speed until the hooks are below the reference height H1. When the encoder determines that the hooks have been lowered below the reference height H1, the central control unit 125 engages the inhibited travel mode to inhibit lateral movements of the crab unit 111; the operating speed of the hoist 113 is unchanged as the lifting frame 115 is lowered. The sling operators 107 guide the slings into position and, when signalled by the crane operator 105, attach two of the slings 117b, 117d to opposing fixing points 119b, 119d on the die 103. If the slings 117a-d do not reach the respective fixing points 119b, 119d, the crane operator 105 may need to reposition the lifting frame 115. The repositioning of the lifting frame 115 can only be performed in incremental steps as the inhibited travel mode is engaged. It is not necessary for the sling operators 107 to retreat to a safe position whilst the lifting frame 115 is repositioned since the die 103 is not attached to the lifting frame 115 and the crane 101 is not performing an initial lift operation. As there is no load applied to the hoist 113 (as detected by the load sensor), the central control unit 125 does not disable the hoist 113 even if the thermal imaging camera 127 determines that a sling 107 operator is within the inner safety region 145.

The sling operators 107 then complete the process of connecting the die 103 by attaching the remaining two slings 117a, 117c to the respective opposing fixing points 119a, 119c, as illustrated in FIG. 9C.

As illustrated in FIG. 9D, the die 103 is thereby connected to the hoist 113. However, before starting to lift the die 103 the crane operator 105 must check that the hoist 113 is over-centre in relation to the die 103. If the hoist 113 is not centred, a load swing will occur when the die 103 is lifted off of the support rack. The sling operators 107 move to a safe position outside of the inner safety region 145 and signal when the crane operator 105 is clear to take the pinch weight. The load cell detects when a load is applied to the hoist 113 and, if the thermal imaging camera 127 detects a sling operator 107 (or other personnel) within the inner safety region 145, operation of the bridge 109, the crab unit 111 and the hoist 113 are disabled. Only when the inner safety region 145 is clear of all personnel can the crane 101 be operated to perform the initial lift of the die 103 (as determined by the load cell). The die 103 is lifted clear of the support rack and held in station until any load swing abates. As a precautionary measure, the central control unit 125 holds the crab unit 111 stationary for a period of time, for example five (5) seconds, following the initial lift. The load swing can abate during this standing time and, as the load is considered to be safe, the sling operator 107 can enter the inner safety region 145. The central control unit 125 does not disable the hoist 113 even if the thermal imaging camera 127 determines that a sling 107 operator is within the inner safety region 145 after this time period. The sling operator 107 can then signal the crane operator 105 that the lift can continue. The crane operator 105 actuates the hoist 113 to raise the die 103 above the reference height H1.

Whilst the die 103 is below the reference height H1, the inhibited travel mode is engaged and lateral travel is inhibited. The central control unit 125 disengages the inhibited travel mode once the die 103 is above the reference height H1 and the crab unit 111 can travel at the normal operating speed. The crane operator 105 then controls the bridge 109 and the crab unit 111 to transport the die 103.

If the load cell detects an increase in the load applied at the hoist 113 whilst the die 103 is travelling in a lateral direction, this may indicate that a collision has occurred. Accordingly, the bridge 109 and the crab unit 111 are brought to a halt if the load cell detects an increase in the applied load during lateral travel.

The procedure for detaching the die 103 from the crane 101 is the reverse of the steps performed to attach the die 103. However, when the die 103 is being lowered, it may be necessary for one or more sling operators 107 to guide the die 103 into position, for example to locate the die 103 on a bolster. Accordingly, during a lowering operation, operation of the hoist 113 is enabled and incremental lateral travel is permitted even if the thermal imaging camera 127 detects the presence of a person within the inner safety region 145. The central control unit 126 can determine when a lowering operation is being performed with reference to one or more of the load cell, the rotary encoder and the control pendant.

The central control unit 125 is provided with an override switch to override restrictions applied to the crane 101. The override switch can, for example, override the inhibited travel mode when the crane is operating below the reference height H1. The override switch can comprise a mechanical or electronic lock. The override switch can be operated in the event of a component failure or to facilitate specific crane servicing or calibration operations, it is envisaged that the lamps 153, 155, 157, 159, 161, 163, 165, 167, 169, 191 in the lamp display unit would flash when the override is in operation to notify the crane operator 105 and the sling operators 107.

The crane 101 described herein can be modified to provide a load position sensor for determining the relative position of a die 103. The load position sensor can comprise a laser transmitter (not shown) provided on the hoist 113 for directing a beam of light onto a reflector (not shown) mounted on the lifting frame 115. A receiver, such as a charge-coupled device, is provided on the hoist 113 for detecting the reflected signal and measuring the position of the lifting frame 115 relative to the hoist 113.

The ability to determine the position of the die 103 is particularly useful for performing an initial lift, if the lifting frame 115 is displaced from the hoist 113 by a distance greater than a defined threshold, the lifting operation of the hoist 113 can be inhibited. The receiver could be configured to provide feedback to the crane operator 105 to indicate the relative position of the lifting frame 115. The central control unit 125 could be configured automatically to centre the hoist 113 above the lifting frame 115 based on a signal from the load position sensor.

Although the present invention has been described with reference to transporting a machine die, it will be appreciated that the crane can be used to transport other loads. Moreover, the present invention has been described with reference to a gantry crane, but the techniques could be used in other types of crane.

Figure 10:
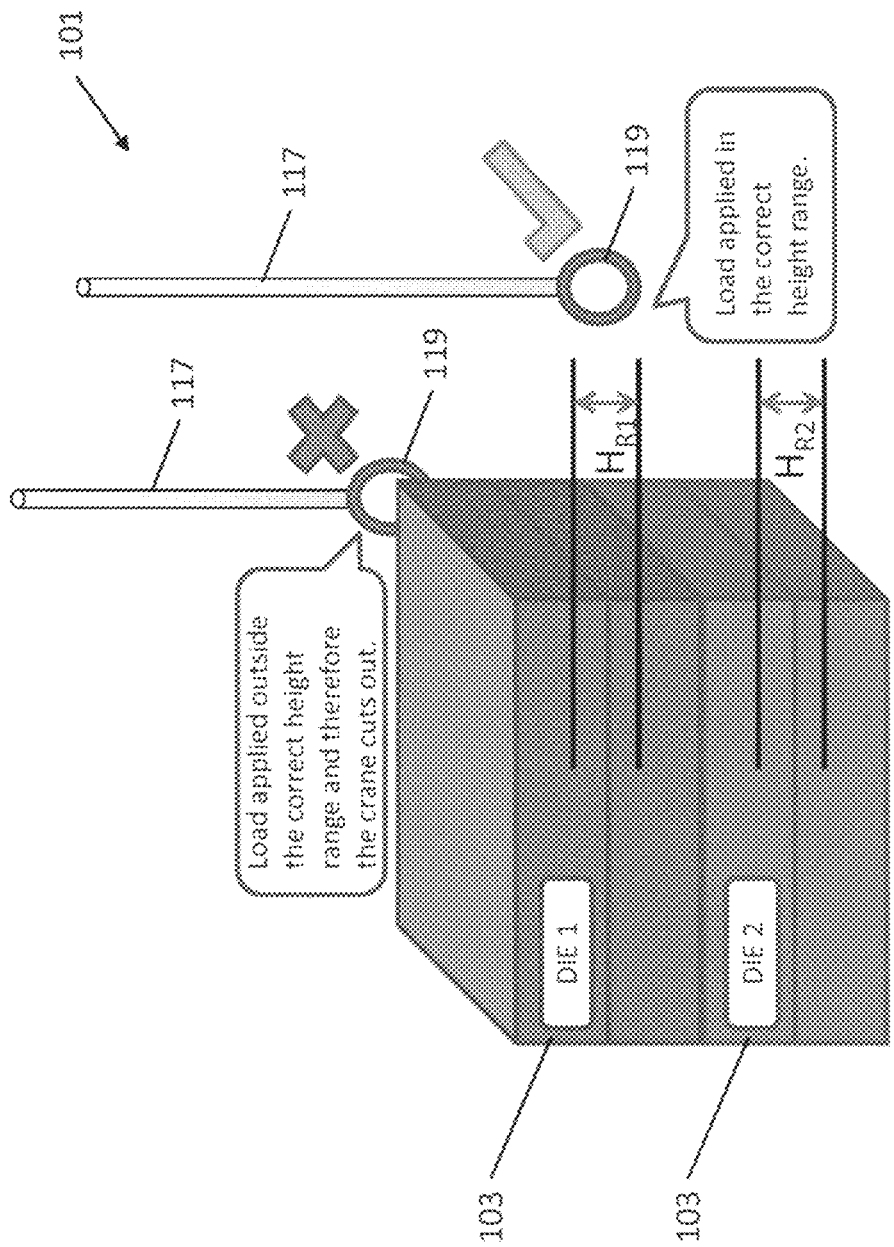
FIG. 10 illustrates controlling operation of the crane based on predefined operating height ranges.

The crane 101 could be further modified to inhibit a hoist lifting operation when the lifting frame lib and/or the couplings 119a-d are outside a pre-defined operating height range $H_R$. The encoder can measure the height of the lifting frame 116 and/or the couplings 119a-d. The central control unit 125 can prevent operation of the hoist to perform an initial lifting operation when the measured height Is outside of a pre-defined operating height range $H_R$. The operating height(s) can be defined with reference to the height of the fixings provided on the die(s) 103 in a particular die bed. For example, as shown in FIG. 10, in a die bed in which the dies 103 are stacked on top of each other, different operating height ranges $H_{R1}$, $H_{R2}$ can be specified corresponding to the height of the fixings for each die 103 in the stack.

A protective sleeve can be arranged around the coupling. The protective sleeve can be made of rubber, or other resilient material. The protective sleeve can comprise an opening and the coupling can be disposed within said opening. The opening can be substantially larger than a width of the coupling, such that the sleeve may protect the coupling from impacts against objects while the coupling is being moved during crane operations. The risk that the coupling may inadvertently snag an object can thus be reduced.

It will be appreciated that various changes and modifications can be made to the embodiment described herein without departing from the scope of the present invention.

The invention claimed is:

1. A crane comprising:
   a hoist for performing a lifting operation;
   a controller for controlling operation of the crane; and
   at least one sensor for detecting the presence of a person in a safety region;
   wherein, when the at least one sensor detects a person in the safety region, the controller is configured to inhibit a lifting operation of the hoist and to enable a lowering operation of the hoist.

2. A crane as claimed in claim 1, wherein said at least one sensor is a camera.

3. A crane as claimed in claim 2, wherein the camera is a thermal imaging camera.

4. A crane as claimed in claim 1, wherein said at least one sensor is a motion detection sensor.

5. A crane as claimed in claim 1, wherein the controller is configured to inhibit said lifting operation by reducing the operating speed of the hoist; or stopping operation of the hoist.

6. A crane as claimed in claim 1, wherein the hoist is movable in at least one lateral direction and the controller is configured to inhibit lateral movement of the hoist when the at least one sensor detects a person in said safety region.

7. A crane as claimed in claim 6, wherein the controller is configured to inhibit lateral movement of the hoist by reducing a travel speed of the hoist; or permitting only incremental lateral movements of the hoist.

8. A crane as claimed in claim 1 further comprising a load sensor for measuring an applied load.

9. A crane as claimed in claim 8, wherein the controller is configured to inhibit an active lifting operation for a defined period of time following detection of an initial lifting operation.

10. A crane as claimed in claim 9 wherein the controller is configured to inhibit the hoist lifting operation by stopping operation of the hoist.

11. A crane as claimed in claim 1 further comprising a display for indicating the operational status of the crane.

12. A crane as claimed in claim 11, wherein the display comprises at least a first indicator for indicating when said at least one sensor detects a person in said safety region.

13. A crane as claimed in claim 11, wherein the display is configured to identify the person detected in said safety region.

14. A crane as claimed in claim 11, wherein the display is mounted on the crane.

15. A crane as claimed in claim 1 further comprising a height sensor for monitoring a height of a coupling attached to the hoist for connection to a load.

16. A crane as claimed in claim 15, wherein the controller is configured to inhibit operation of the crane when the height sensor detects that the coupling is below a pre-defined operating height.

17. A method of operating a crane comprising a hoist for performing a lifting operation and at least one sensor for detecting the presence of a person in a safety region;
   wherein, when the at least one sensor detects a person in the safety region, the method comprises inhibiting a lifting operation of the hoist and enabling a lowering operation of the hoist.

18. A method as claimed in claim 17, further comprising measuring an applied load; wherein the method comprises stopping a hoist lifting operation for a defined period of time following detection of an initial applied load.

19. A method as claimed in claim 17 further comprising identifying a person detected in the safety region by determining the location of a portable safety unit associated with that person.

20. A crane control system for implementing a method as claimed in claim 17.

\* \* \* \* \*